United States Patent [19]
Reist

[11] 4,397,145
[45] Aug. 9, 1983

[54] UNIVERSAL LINK CHAIN

[75] Inventor: Walter Reist, Hinwil, Switzerland

[73] Assignee: Ferag AG, Hinwil, Switzerland

[21] Appl. No.: 268,729

[22] Filed: Jun. 1, 1981

[30] Foreign Application Priority Data

Jun. 6, 1980 [CH] Switzerland ............... 4381/80

[51] Int. Cl.³ .................................. F16G 13/20
[52] U.S. Cl. .................................. 59/78; 59/85;
198/853
[58] Field of Search .............. 59/78, 80, 82, 84, 85,
59/95; 198/853, 852, 850; 403/141; 72/466;
285/321

[56] References Cited

U.S. PATENT DOCUMENTS 1,947,113  2/1934  Russell ........................ 59/78
3,190,106  6/1965  Spates ........................ 72/466
3,744,618  7/1973  Monne ........................ 198/852
3,757,514  9/1973  Reist ........................... 59/78
4,315,423  2/1982  McGuire ...................... 72/466

Primary Examiner—Gene Crosby
Attorney, Agent, or Firm—Werner W. Kleeman

[57] ABSTRACT

A universal or ball pivot-link chain arrangement has chain link elements subdivided in an axial plane, each chain link element has a ball pivot body provided with an undercut portion of substantially hemispherical shape. A ball socket enclosing the ball pivot body of an adjacent link has a ring connection at the region of said undercut portion of the adjacent link. Each ring connection has ring-shaped braces engaging countersurfaces of the ball socket. These braces are effective not only in the radial direction, but are arranged to act as blocking devices against any relative displacement of the two halves of the chain link elements in the axial direction.

11 Claims, 3 Drawing Figures

UNIVERSAL LINK CHAIN

BACKGROUND OF THE INVENTION

The invention refers to a universal ball pivot-link chain arrangement comprising a plurality of chain link elements, each of said chain link elements possessing at one end a ball pivot body and at the other end a ball socket adapted to receive the ball pivot body of the directly neighboring chain link element, each of said chain link elements being subdivided in an axial plane into two halves and possessing a ring connection located in the end region of the ball socket.

A universal link chain of the aforementioned kind is disclosed in U.K. Pat. No. 980'302. It is used there as a tension chain for load hoisting hooks guided on rails by means of rollers. The load hoisting hooks are connected with the chain link elements by way of two bearing sleeve halves fastened to each other by screws, each chain link element shaft adapted to connect the ball pivot body with the ball socket being held in place between said two bearing sleeve halves. In spite of this additional connection a wedge is inserted between the two chain link element halves and made to engage a recess in each of said halves to safely prevent any axial displacement therebetween. This same object is pursued by the provision of a shoulder on the chain link element shaft, which is thus embraced by the bearing sleeves laterally too, so as to make them hold the halves of the chain link elements fixed not only in the radial but also in the axial direction. All of these measures indicates that if the chain link elements are subdivided into two halves which must be held together but also secured against a relative motion in the contact plane thereof, it is extremely difficult to maintain the geometrically correct form of the ball pivot body and the counter surface of the ball socket, particularly under varying operating conditions. In this connection it is noteworthy, that this known link chain is meant to transmit pulling forces only, which results in a continuous centering process taking place between the ball pivot bodies and the ball sockets enclosing the same because the chain is continuously being stretched. In a thrust or pushing type operation, on the other hand, in which the chain would have to be guided within a channel or some similar guide means, the neighboring chain link elements show a tendency to buckle, resulting in forces acting individually upon the halves of the chain link elements and thereby creating the danger of a relative displacement between said two halves.

SUMMARY OF THE INVENTION

Hence from what has been explained heretofore it should be apparent that the art is still in need of universal ball pivot-link chain constructions which are not associated with the aforementioned drawbacks and limitations of the state-of-the-art proposals. It is therefore a primary object of the present invention to provide a novel construction of a universal ball pivot-link chain which is not associated with the drawbacks and limitations of the prior art as heretofore discussed and which effectively and reliably fulfills the existing need in the art.

Another and more specific object of the present invention relates to a new and improved universal ball pivot-link chain arrangement comprising chain link elements subdivided in an axial plane, the two halves to be connected by simple means to form a monolithic whole, i.e. in a way as if each chain link element were formed of one piece. To state it differently, it is intended to provide the link chain with features it would have, if the ball pivot body could be made "to grow" within a closed ball socket, if this were possible, without any special steps being required for introducing the ball pivot body into the ball socket and to hold it there in place.

This would provide, among other things, the unlimited possibility of using the chain link elements, in spite of their being divided, in a pushing type of operation, and to drive them, if necessary, by means of chain sprocket wheels. Due to the above considerations, the use of chain link elements subdivided into two halves within an axial plane could not hold out any promise for success. The main cause for this lies in the fact, that in an operation within a chain guide channel, and even more so in an operation with chain sprocket wheels the forces acting on the two halves of the same chain link element may be of different magnitudes. Furthermore these force relations are subject to change from one chain link element to the next one if the chain link elements are able to rotate relative to each other, thus making the dividing planes of adjacent elements tilt in different directions relative to one another. Thus, a chain sprocket wheel may engage both halves of one chain link element, even though to different degrees or it may engage one half only of the subsequent element, in line with the circumstance, that said subsequent element is so rotated with respect to its own axis, that it turns toward the sprocket wheel with its corresponding half only.

In spite of having its chain link elements subdivided into two halves within an axial plane the chain according to the invention possesses, the properties it would have if the chain link elements were made of one piece and the ball pivot body would be made to "grow" within the ball socket of the neighboring chain link element. This is to be attributed mainly to the circumstance that the retaining rings do not just hold together the two halves of the chain link elements like a peripheral brace, in the radial direction, but they are effective, by mutual support and complementary action, in preventing any relative displacement of the two halves within their plane of contact. Thus, the retainer rings would resist any axial displacement, in a manner similar to that encountered in the case of friction type locking devices, where even the smallest friction force results in a direct increase in the compression force perpendicular to said friction force. Furthermore, the connection by means of the retainer rings acts not only upon the ball socket but also on the ball pivot body located at the other end of the same chain link element, so that the geometrically correct ball shape is guaranteed, without requiring any contribution from the ball socket of the neighboring chain element, as was the case for the above described known chain.

Due to its substantially hemispherical undercut portion the ball pivot body possesses two concentric spherical surfaces of different radii of curvature, the bearing surface having the smaller radius of curvature, meaning the undercut portion of about hemispherical shape, being arranged forwardly of the bearing surface having the larger radius of curvature in the direction of the neighboring chain element. Within the framework of this design the present embodiment has a certain similarity with a universal link chain arrangement disclosed in German Pat. No. 22 20 259 and the corresponding U.S. Pat. No. 3,757,514. In this chain, which also may be used in an operation involving pushing forces, the object was to reduce the radial dimensions of the ball pivot elements and to reduce at the same time the friction forces acting on the chain when guided within a guide tube. For this purpose the hemispherical bearing surface has been arranged at the end of a slender conical extension diverging toward the bearing surface having the larger radius of curvature. At the same time, the ball socket is subdivided by means of slots into a number of segments, the conical ball pivot bodies may be inserted into the ball socket by forcing it apart. It is noteworthy, that even though the chain link elements of this known chain comprise slots extending lengthwise, they are not subdivided into halves independent of each other. Thus, the segments of the chain link elements separated by slots are all made of one piece. They may be moved in a radial direction relative to one another but are restricted with respect to any other type of movement. This one-piece construction was apparently considered absolutely necessary for satisfying the compulsory requirement of maintaining the bearing surfaces in their geometrically correct shape, and it is particularly worth noticing, that the bearing surface provided for a pushing type of operation has been left without slots. In contradistinction to this known chain although the link chain of the invention has chain link elements subdivided into two halves within an axial plane, and even though the retainer rings are provided only at the region of the ball socket, the chain link elements possess the properties of a chain link formed of one piece, even in the region of the ball pivot body located at the other end of the chain link element. Expressed in another way one may say, that the ball socket fulfills no holding function in relation to the ball pivot body enclosed therein. A chain of this kind may thus very well be used for example as a type of pushing rod, whereby the ball pivot body of the foremost chain link element is adapted to engage the item to be displaced, a machine part, for example. Even if in the course of such operation the point of action between said machine part and said foremost chain link element undergoes changes as a result of manufacturing inaccuracies or if because of any rotation of the chain link element and/or the machine part causing the pushing forces to act essentially upon one half of the foremost chain link element only, such changes are inconsequential in their effects, because the chain link elements possess the properties of a link element made of a single piece.

BRIEF DESCRIPTION OF THE DRAWINGS

Various objects, features and attendant advantages of the present invention will be more fully appreciated as the same becomes better understood from the following detailed description of embodiments thereof when considered in connection with the accompanying drawings, in which.

DETAILED DESCRIPTION OF THE PREFERRED EMBODIMENTS

Figure 1:
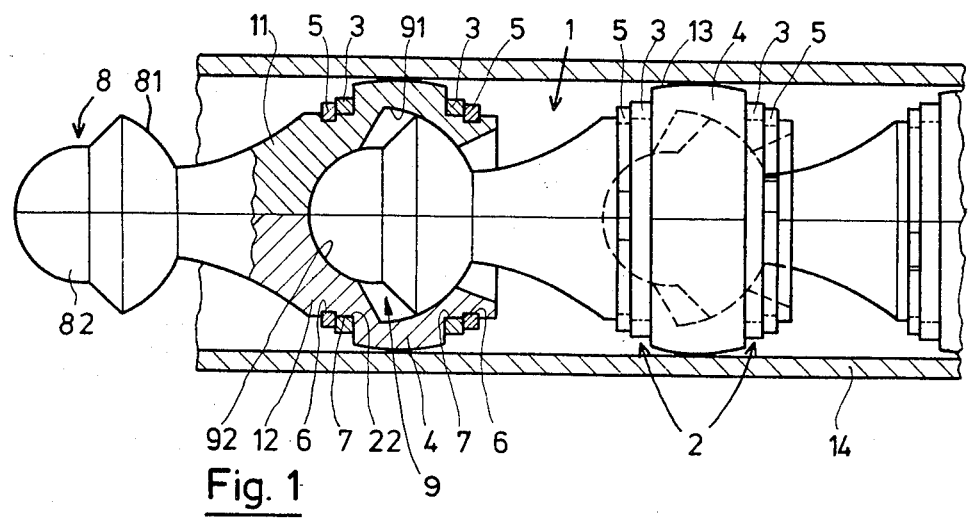
FIG. 1 shows a first embodiment of a chain guided within a tube.

Each chain link element, generally identified by reference numeral 1, is subdivided into two halves 11 and 12 connected with each other by means of ring connections, generally identified by reference numeral 2. Each ring connection 2 comprises a retainer ring 3, which abuts against one of the front surfaces of a peripheral annular shoulder 4 and is held fixed between this annular shoulder 4 and a snap ring 5. For this purpose, the snap rings 5 are made to penetrate into the grooves 6. The retainer rings 3 possess rectangular cross-sections, each retainer ring 3 being made to fittingly surround a cylindrical surface 7 of its chain link element. The retainer rings 3 of the present design thus comprise two plane front surfaces able to serve as axial supporting surfaces, as well as a hollow cylindrical surface effective in the radial direction. The snap rings 5, too, have been provided with rectangular cross-sections. The two halves 11 and 12 are connected to form a whole only by means of the ring connections 2, as may be seen for the chain link element appearing in the drawing on the left, rendering it thus superfluous to have to hold together the ball pivot body, generally identified by the reference numeral 8, by any other means such as the ball socket. As mentioned before, the ball pivot body 8 comprises an undercut portion 82 of roughly hemispherical shape and a ring-shaped bearing surface 81 having its curvature established by the larger (original) radius. The ball sockets, generally identified by reference numeral 9, are provided with corresponding counterbearing surfaces 91 and 92. The arrangement is such, that the retainer rings 3 and the snap rings 5 of the ring connections 2 are located at the regions of the bearing surfaces 81 and 82 and the corresponding counterbearing surfaces 91 and 92. The spreading action developed in these regions is transferred directly to the related ring connection 2 and is completely neutralized at this location. At the same time, any possibility of impairment of the correct geometrical shape of the ball socket 9 is excluded. In this context, it is the ring connections which also guarantee the correctness of shape of the ball pivot bodies 8, in particular that of their two bearing surfaces which are unequally curved. The same obviously applies to the annular shoulder 4 and to the convex guide surface 13 provided at the periphery thereof and guided in the embodiment shown within the guide tube 14. At the same time it is possible to properly adhere to the minimum play required for the faultless functioning of the chain, exactly as if the chain link elements were made of one piece. The significance of this fact becomes particularly evident if one keeps in mind, that the drawing is shown significantly enlarged in relation to most of the practical applications. As a matter of fact, both driving and actuation forces may be transmitted both in rotational and in reciprocating operation while using considerably reduced radial dimensions of the chain link elements. Embodiments made of injection molded plastics have proved particularly successful in this respect.

Figure 2:
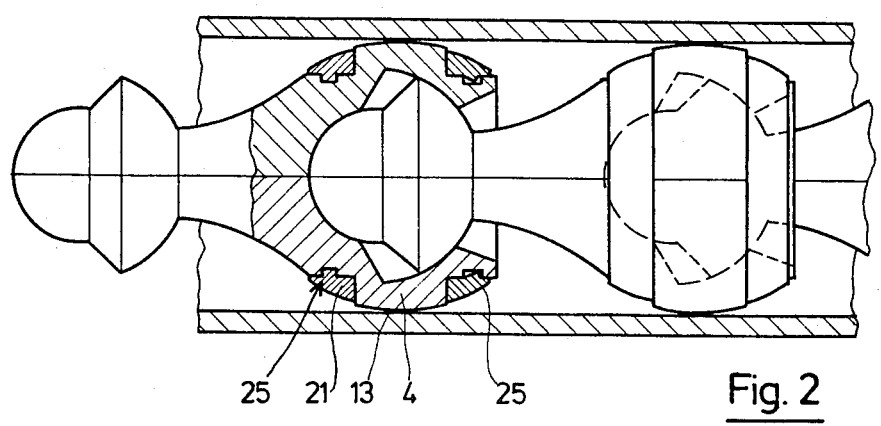
FIG. 2 shows another embodiment of a chain guided within a tube.
Figure 3:
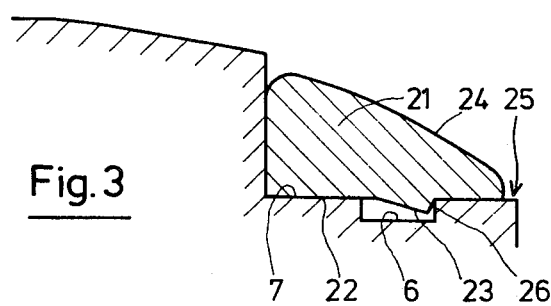
FIG. 3 shows a detail of the embodiment of FIG. 2 drawn at a larger scale.

The ring connections of the embodiment of FIGS. 2 and 3 are each formed of a one piece ring 21 comprising a hollow cylindrical retaining surface 22. This surface 22 fittingly bears on the cylindrical counter surface 7 of the chain link elements. A ring-shaped projection or protruding part 23 of the retaining surface comprises a saw tooth shaped cross-section and penetrates like a barb into the groove 6. The ring 21 comprises a spherical outer surface 24 arranged to be essentially an extension of the guide surface 13 both being concentrical with the bearing surfaces of the ball socket. Thereby the cross-section of the ring 21 decreases toward the ring-shaped projection 23 and the ring 21 is made to possess a higher compliance or yielding capability in the region of said projections or protruding parts 23. The ring 21 is made of a material so selected, that while being elastically expandable, the ring 21 may be slid over the cylindrical sections 25 undercut in relation to the peripheral annular shoulder 4, said sections 25 comprising the counter surfaces 7 and the grooves 6. The projection 23 thus forms a snap connection. The steep flank 26 of the projection 23 is also preferably inclined, to make the frontal surfaces of the ring 21 and the peripheral annular shoulder 4 fittingly abut against one another.

The aforedescribed measures result in the exclusion of any relative motion of the two halves of the chain link elements, each of which forms a complete whole. External effects, due for example to unequal friction within the guide tube or to the action of sprocket wheels, or even to the mutual influence of the chain link elements upon one another, fail to produce any deformation. Moreover, the rings 21 lend themselves well for coaction with sprocket wheels and other driving members. Any differences in the positions of rotation of the chain link elements thus become neutralized. It is also worth mentioning that the aforedescribed embodiment shown in FIGS. 2 and 3 may be assembled without any tools, because the rings 21 may be easily slid over the extensions 25 by hand, whether their dimensions are large or small. These rings 21 may be removed with similar ease by means of a blade.

The chain link elements and the ring connections may be made partially or wholly of a plastic material. In the embodiment of FIG. 1, of course, the snap rings 5 would be made of steel and the retainer rings 3, if necessary, of a metal. In the embodiment of FIGS. 2 and 3 the retainer ring and the snap ring are united into a single ring 21, as described above, the thicker section of which representing the retainer ring, and the section of diminishing thickness and comprising the ring shaped protrusion representing the snap ring.

Obviously, numerous modifications and variations of the present invention are possible in the light of the above teachings. It is therefore to be understood that within the scope of the appended claims the invention may be practiced otherwise than as specifically described herein. Accordingly,

What I claim is:

1. A universal link chain arrangement comprising:
a plurality of chain link elements, each of said chain link elements possessing at one end a ball pivot body and at the other end a ball socket adapted to receive the ball pivot body of the directly neighboring chain link element, each of said chain link elements being subdivided in an axial plane into two separate halves and possessing a first ring connection located at the end region of the ball socket, said ball pivot body having an undercut portion of hemispherical shape, said ball socket being surrounded by a second ring connection located at the region of said undercut portion of the directly neighboring chain link element, both of said ring connections being retainer rings spaced axially out of contact from each other and fittingly bearing on counter surfaces of the ball socket, whereby the retainer rings may be slid over the two halves from opposite end regions of the ball socket.

2. The link chain arrangement as defined in claim 1, wherein said counter surfaces of the ball socket and working surfaces of the retainer rings are cylindrical in shape.

3. A universal link chain arrangement comprising:
a plurality of chain link elements, each of said chain link elements possessing at one end a ball pivot body and at the other end a ball socket adapted to receive the ball pivot body of the directly neighboring chain link element, each of said chain link elements being subdivided in an axial plane into two separate halves and possessing a first ring connection located at the end region of the ball socket, said ball pivot body having an undercut portion of hemispherical shape, said ball socket being surrounded by a second ring connection located at the region of said undercut portion of the directly neighboring chain link element, both of said ring connections having retainer rings spaced axially from each other and fittingly bearing on counter surfaces of the ball socket;
wherein said counter surfaces of the ball socket and working surfaces of the retainer rings are cylindrical in shape; and
wherein said counter surfaces are provided on opposing sides of a peripheral annular shoulder of the ball socket.

4. A universal link chain arrangement comprising a plurality of chain link elements, each of said chain link elements possessing at one end a ball pivot body and at the other end a ball socket adapted to receive the ball pivot body of the directly neighboring chain link element, each of said chain link elements being subdivided in an axial plane into two halves and possessing a first ring connection located at the end region of the ball socket, said ball pivot body comprising an undercut portion of hemispherical shape and the ball socket is surrounded by a second ring connection located at the region of said undercut portion of a neighboring chain link, both of said ring connections comprising retainer rings fittingly bearing on counter surfaces of the ball socket, and said retainer rings each being supported in the axial direction by a respective expanding component engaging a peripheral groove of the ball socket.

5. The link chain arrangement as defined in claim 4, wherein retainer rings and snap rings are provided, and said snap rings define said expanding components.

6. The link arrangement as defined in claim 5, wherein the snap rings comprise rectangular cross-sections.

7. The link chain arrangement as defined in claim 4, wherein the retainer rings comprise parts engaging the peripheral groove and said retainer rings are adapted to elastically expand at the region of said parts.

8. The link chain arrangement as defined in claim 7, wherein the retainer rings possess a reduced cross-section in the region of the parts engaging the peripharal groove.

9. The link chain arrangement as defined in claim 7 or 8, wherein the retainer ring parts engaging the groove are saw tooth shaped and each comprise a steep flank engaging a wall of said groove.

10. A universal link chain arrangement comprising:
a plurality of chain link elements, each of said chain link elements possessing at one end a ball pivot body and at the other end a ball socket adapted to receive the ball pivot body of the directly neighboring chain link element, each of said chain link elements being subdivided in an axial plane into two separate halves and possessing a first ring connection located at the end region of the ball socket, said ball pivot body having an undercut portion of hemispherical shape, said ball socket being surrounded by a second ring connection located at the region of said undercut portion of the directly neighboring chain link element, both of said ring connections having retainer rings spaced axially from each other and fittingly bearing on counter surfaces of the ball socket;

wherein the ball socket comprises a spherical ring-shaped guide surface located between the retainer rings.

11. The link chain arrangement as defined in claim 10, wherein the peripheral surfaces of the retainer rings are adapted to form spherical extensions of the guide surfaces.

* * * * *